United States Patent
Ohmori et al.

(10) Patent No.: US 10,033,059 B2
(45) Date of Patent: Jul. 24, 2018

(54) FUEL CELL

(71) Applicant: NGK INSULATORS, LTD., Nagoya-shi, Aichi (JP)

(72) Inventors: Makoto Ohmori, Nagoya (JP); Ayano Kobayashi, Nagoya (JP); Shinji Fujisaki, Kuwana (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 15/350,671

(22) Filed: Nov. 14, 2016

(65) Prior Publication Data
US 2017/0062857 A1 Mar. 2, 2017

Related U.S. Application Data

(63) Continuation of application No. PCT/JP2015/064815, filed on May 22, 2015.

(30) Foreign Application Priority Data

May 26, 2014 (JP) .................. 2014-108395
Mar. 2, 2015 (JP) .................. 2015-040495

(51) Int. Cl.
*H01M 8/12* (2016.01)
*H01M 8/1253* (2016.01)
(Continued)

(52) U.S. Cl.
CPC ........... *H01M 8/1253* (2013.01); *B32B 18/00* (2013.01); *C04B 35/486* (2013.01); *C04B 35/50* (2013.01);
(Continued)

(58) Field of Classification Search
USPC ....................................... 429/496
See application file for complete search history.

(56) References Cited

U.S. PATENT DOCUMENTS 6,787,261 B2 * 9/2004 Ukai ................. C04B 35/486
                                            429/486
8,067,129 B2 * 11/2011 Couse ............... H01M 4/8885
                                            429/479
(Continued)

FOREIGN PATENT DOCUMENTS

JP      2004-67489 A    3/2004
JP      2009-238430 A   10/2009
(Continued)

OTHER PUBLICATIONS

Kishimoto et al., "Fundamental Technologies for Enhancing Durability by Thermodynamic Analysis", pp. 40-43, Dec. 17 to 18, 2012, 21st SOFC Poster Session.
(Continued)

*Primary Examiner* — Tracy M Dove
(74) *Attorney, Agent, or Firm* — Global IP Counselors, LLP

(57) ABSTRACT

A fuel cell comprises an anode, a cathode, and a solid electrolyte layer. The solid electrolyte layer includes a first region disposed on the anode and a second region disposed between the first region and the cathode. The ratio of the ceria-based material in the first region is less than or equal to 0.5%. The ratio of the tetragonal crystal zirconia in the first region is greater than or equal to 3.0%. The atomic weight ratio of nickel to zirconia in the first region is less than or equal to 3.0 at %. The ratio of the ceria-based material in the second region is greater than or equal to 1.0%. The ratio of the tetragonal crystal zirconia in the second region is less than or equal to 0.1%.

1 Claim, 3 Drawing Sheets

(51) Int. Cl.
*B32B 18/00* (2006.01)
*C04B 35/486* (2006.01)
*C04B 35/50* (2006.01)
*H01M 8/1213* (2016.01)
*H01M 8/126* (2016.01)
*H01M 8/124* (2016.01)

(52) U.S. Cl.
CPC ......... *H01M 8/126* (2013.01); *H01M 8/1213* (2013.01); *C04B 2235/3229* (2013.01); *C04B 2235/3279* (2013.01); *C04B 2235/762* (2013.01); *C04B 2235/765* (2013.01); *H01M 2008/1293* (2013.01); *H01M 2300/0077* (2013.01); *H01M 2300/0094* (2013.01); *Y02E 60/525* (2013.01); *Y02P 70/56* (2015.11)

(56) References Cited

U.S. PATENT DOCUMENTS

| 2008/0075984 A1 | 3/2008 | Badding et al. |
| 2009/0047562 A1 | 2/2009 | Hata et al. |
| 2011/0183233 A1 | 7/2011 | Armstrong et al. |
| 2013/0309582 A1 | 11/2013 | Shimazu et al. |
| 2014/0051010 A1 | 2/2014 | Armstrong et al. |
| 2014/0141344 A1* | 5/2014 | Miller ................. H01M 8/1253 429/408 |

FOREIGN PATENT DOCUMENTS

| JP | 2010-505235 A | 2/2010 |
| JP | 2013-8684 A | 1/2013 |
| JP | 2013-518389 A | 5/2013 |
| WO | 2012/105580 A1 | 8/2012 |

OTHER PUBLICATIONS

International Search Report dated Aug. 18, 2016 for the corresponding International Application No. PCT/JP2015/064815.
International Preliminary Report on Patentability dated Nov. 29, 2016 for the corresponding International Application No. PCT/JP2015/064815.

* cited by examiner

FUEL CELL

TECHNICAL FIELD

The present invention relates to a fuel cell.

BACKGROUND ART

A typical fuel cell is known to include an anode, a cathode, and a solid electrolyte layer disposed between the anode and the cathode (For example, reference is made to Japanese Patent Application Laid-Open No. 2009-228430).

In Japanese Patent Application Laid-Open No. 2009-228430, YSZ (yttria-stabilized zirconia) is used as the main component of the solid electrolyte layer.

It is known that there is a phase transformation of the zirconia contained in the solid electrolyte layer from cubic crystals to tetragonal crystals in the operating conditions of the fuel cell (reference is made for example to "*Netsuriki-gakuteki Kaiseki in yoru Taikyusei Kojo no tame no Kiban Gijutsu Kaihatsu*", Haruo KISHIMOTO (nine others), Dec. 17 to 18, 2012, 21$^{st}$ SOFC Poster Session).

This zirconia phase transformation exhibits a tendency to progress from the anode side to the cathode side.

SUMMARY OF INVENTION

Technical Problem

However, when the phase transformation of the zirconia progresses, there is the problem there is a reduction in the electrical conductivity of the solid electrolyte layer. Consequently, there is a need to suppress a reduction in the electrical conductivity of the solid electrolyte layer and maintain the connection of the anode and the solid electrolyte layer.

The present invention is proposed in light of the above circumstances, and has the object of providing a fuel cell that can suppress a reduction in the electrical conductivity of the solid electrolyte layer and maintain the connectivity of the anode and the solid electrolyte layer.

Solution to Problem

The fuel cell according to the present invention comprises an anode, a cathode, and a solid electrolyte layer disposed between the anode and the cathode. The anode 20 contains an oxygen ion conducting material and nickel. The solid electrolyte layer contains a zirconia-based material as a main component, and contains a ceria-based material and nickel as secondary components. The solid electrolyte layer includes a first region disposed on the anode and a second region disposed between the first region and the cathode. The ratio of the ceria-based material to the total amount of the ceria-based material and the zirconia-based material in the first region is less than or equal to 0.5%. The ratio of the tetragonal crystal zirconia to the total amount of the tetragonal crystal zirconia and the cubic crystal zirconia in the first region is greater than or equal to 3.0%. The atomic weight ratio of nickel to zirconia in the first region is less than or equal to 3.0 at %. The ratio of the ceria-based material to the total amount of the ceria-based material and the zirconia-based material in the second region is greater than or equal to 1.0%. The ratio of the tetragonal crystal zirconia to the total amount of the tetragonal crystal zirconia and the cubic crystal zirconia in the second region is less than or equal to 0.1%.

Advantageous Effects of Invention

The present invention provides a fuel cell that can suppress a reduction in the electrical conductivity of the solid electrolyte layer and maintain the connectivity of the anode and the solid electrolyte layer.

DESCRIPTION OF EMBODIMENTS

Figure 1:
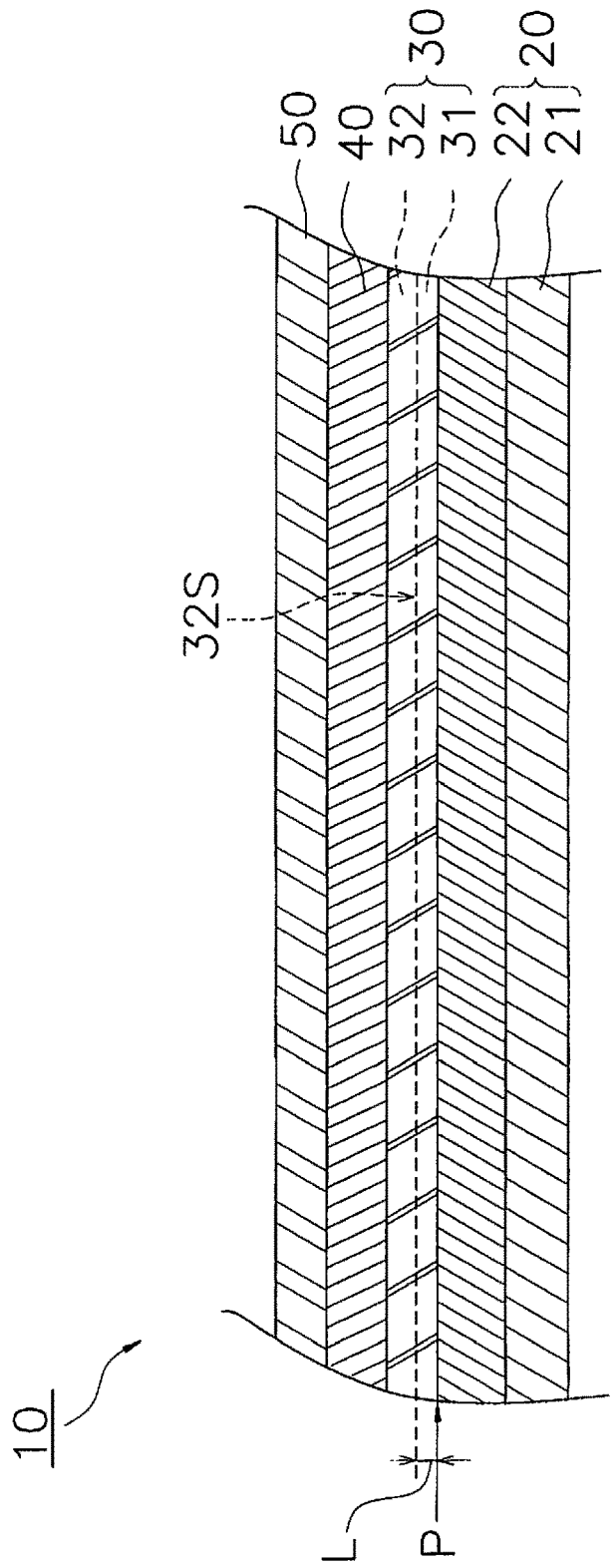
FIG. 1 is an enlarged cross sectional view of the configuration of a fuel cell.

An embodiment of the present invention will be described below making reference to the figures. Those aspects of configuration in the following description of the figures that are the same or similar are denoted by the same or similar reference numerals. However, the figures are merely illustrative, and the actual ratios or the like of the respective dimensions may differ. Therefore, the specific dimensions or the like should be determined by making reference to the following description. Alternatively, it is naturally the case that portions are included that exhibit a different ratio or relationship between dimensions in the respective figures.

Configuration of Fuel Cell 10

A configuration of a fuel cell 10 will be described making reference to the figures. FIG. 1 is an enlarged cross sectional view of the configuration of a fuel cell 10.

The fuel cell 10 is configured as a so-called solid oxide fuel cell (SOFC). The possible configurations of the fuel cell 10 include a flat-tubular type, a segmented-in-series type, an anode-supporting type, an electrolyte flat-plate type, a cylindrical type, or the like. As illustrated in FIG. 1, the fuel cell 10 includes an anode 20, a solid electrolyte layer 30, a barrier layer 40 and a cathode 50.

The anode 20 functions as the anode for the fuel cell 10. The anode 20 is a porous tabular fired body. As illustrated in FIG. 1, the anode 20 includes an anode current collecting layer 21 and an anode active layer 22.

The anode current collecting layer 21 is configured as a porous body that exhibits superior gas permeability. The constituent material for the anode current collecting layer 21 includes use of a material used in the anode current collecting layer of a conventional SOFC, and for example, includes NiO (nickel oxide)-8YSZ (8 mol % of yttria-stabilized zirconia), or NiO—$Y_2O_3$ (yttria). However when NiO is included in the anode current collecting layer 21, at least a portion of the NiO may be reduced to Ni. The thickness of the anode current collecting layer 21 may be configured as 0.2 mm to 5.0 mm.

The anode active layer 22 is disposed on the anode current collecting layer 21. The anode active layer 22 is a porous body that is denser than the anode current collecting layer 21. The constituent material for the anode active layer 22 includes use of a material used in an anode active layer of a conventional SOFC, and for example, includes Ni and an oxygen ion conducting material. The oxygen ion conducting material for example includes a zirconia-based material such as 8YSZ, 10YSZ (10 mol % of yttria-stabilized zirconia) and ScSZ (scandia-stabilized zirconia), or a ceria-based material such as $CeO_2$ (ceria), GDC (gadolinium-doped ceria) and SDC (samarium-doped ceria). The anode active layer 22 may contain Ni in the form of NiO. At least a portion of the NiO contained in the anode active layer 22 may be reduced to Ni. The thickness of the anode active layer 22 may be configured as 5.0 micrometers to 30 micrometers.

The solid electrolyte layer 30 is disposed on the anode 20. The solid electrolyte layer 30 contains a zirconia-based material as a main component, and contains a ceria-based material as a secondary component. The zirconia-based material includes 8YSZ, 10YSZ, ScSZ, or the like. The ceria-based material includes $CeO_2$, GDC, SDC, or the like.

The solid electrolyte layer 30 contains Ni. The solid electrolyte layer 30 may contain Ni as NiO. At least a portion of the NiO contained in the solid electrolyte layer 30 may be reduced to Ni.

The solid electrolyte layer 30 forms an interface P with reference to the anode 20. The interface P may be determined based on a line of rapid change in the concentration distribution when mapping the component concentration of the solid electrolyte layer 30 and the anode 20, or a line of rapid change in the porosity between the solid electrolyte layer 30 and the anode 20. The configuration of the solid electrolyte layer 30 will be described below.

In the present embodiment, the term such that composition X "contains as a main component" composition Y means that composition Y preferably occupies greater than or equal to 60 wt % of the total of composition X, more preferably occupies greater than or equal to 70 wt %, and still more preferably occupies greater than or equal to 90 wt %. The term such that composition X "contains as a secondary component" composition Z means that composition Z preferably occupies less than or equal to 40 wt % of the total of composition X, more preferably occupies less than or equal to 30 wt %, and still more preferably occupies less than or equal to 10 wt %.

The barrier layer 40 is disposed between the solid electrolyte layer 30 and the cathode 50. The barrier layer 40 inhibits formation of a high resistance layer between the solid electrolyte layer 30 and the cathode 50. The barrier layer 40 is preferably configured as a dense fired body. The material used in the barrier layer 40 includes use of $CeO_2$, GDC, SDC, or the like. The thickness of the barrier layer 40 may be configured as 3 micrometers to 20 micrometers. The fuel cell 10 may omit inclusion of the barrier layer 40.

The cathode 50 is disposed on the barrier layer 40. The cathode 50 functions as a cathode for the fuel cell 10. The cathode 50 is a porous fired body. The main component of the cathode 50 is a perovskite composite oxide including at least one of La or Sr at the A site and that is expressed by the general formula $ABO_3$. This type of perovskite composite oxide includes (La, Sr) (Co, Fe)$O_3$, (La, Sr)FeO$_3$, (La, Sr)CoO$_3$, LaSrMnO$_3$, or the like. The thickness of the cathode 50 is configured as 5 micrometers to 50 micrometers. When the barrier layer 40 is omitted from the fuel cell 10, the cathode 50 is disposed on the solid electrolyte layer 30.

Configuration of Solid Electrolyte Layer 30

The solid electrolyte layer as illustrated in FIG. 1 includes a first region 31 and a second region 32. The first region 31 is disposed on the anode 20. The second region 32 is disposed on the first region 31.

The first region 31 contains a zirconia-based material. The zirconia-based material includes 8YSZ, 10YSZ, ScSZ, or the like. The first region 31 contains cubic crystal zirconia and tetragonal crystal zirconia. The ratio of the tetragonal crystal zirconia to the total amount of the tetragonal crystal zirconia and the cubic crystal zirconia in the first region 31 is greater than or equal to 3.0%.

The first region 31 may contain a ceria-based material. Although the ceria-based material includes use of GDC, SDC, or the like, there is no limitation in this regard. The ratio of the ceria-based material to the total amount of the ceria-based material and the zirconia-based material in the first region 31 is less than or equal to 0.5%. The first region 31 may omit inclusion of the ceria-based material. However, even in a configuration in which a minute amount of a ceria-based material is included in the first region 31, it may be stated that the first region 31 does not substantially contain the ceria-based material when the ratio of the ceria-based material to the total amount of the ceria-based material and the zirconia-based material in the first region 31 is less than or equal to 0.1%. In this manner, it is possible to inhibit an excessive expansion of the first region 31 during reduction reactions after firing by limiting the ceria ratio in the first region 31.

The first region 31 contains Ni. The first region 31 may contain Ni as NiO. The Ni and/or NiO contained in the first region 31 may be configured as a solid solution of the zirconia-based material (at least one of cubic crystal zirconia and tetragonal crystal zirconia). In this configuration, the Ni and/or NiO contained in the first region 31 may be positioned in the particles of the zirconia-based material. The atomic weight ratio of Ni to Zr in the first region 31 is greater than 0.0 at % and less than or equal to 3.0 at %.

The second region 32 contains a zirconia-based material. The zirconia-based material includes 8YSZ, 10YSZ, ScSZ, or the like. The ratio of the tetragonal crystal zirconia to the total amount of the tetragonal crystal zirconia and the cubic crystal zirconia in the second region 32 is less than or equal to 0.1%. The second region 32 may omit inclusion of tetragonal crystal zirconia. However, even in a configuration in which a minute amount of a tetragonal crystal zirconia is included in the second region 32, it may be stated that the second region 32 does not substantially contain the tetragonal crystal zirconia when the ratio of the tetragonal crystal zirconia to the total amount of the tetragonal crystal zirconia and the cubic crystal zirconia in the second region 32 is less than or equal to 0.1%. A first region side surface 32S of the second region 32 may be defined with reference to a line at which the ratio of the tetragonal crystal zirconia to the total amount of the tetragonal crystal zirconia and the cubic crystal zirconia takes a value of 0.1%.

The second region 32 may contain a ceria-based material. Although the ceria-based material includes use of GDC, SDC, or the like, there is no limitation in this regard. The ratio of the ceria-based material to the total amount of the ceria-based material and the zirconia-based material in the second region 32 is greater than or equal to 1.0%. In this manner, it is possible to inhibit the ratio of the tetragonal crystal zirconia in the second region 32 by maintaining the ratio of the ceria-based material in the second region 32.

In the present embodiment, the feature of "the ratio of the tetragonal crystal zirconia to the total amount of the tetragonal crystal zirconia and the cubic crystal zirconia" is a general concept of a Raman spectrum intensity ratio calculated based on Raman spectrum analysis with reference to a cross section. Although the feature of "the ratio of the tetragonal crystal zirconia to the total amount of the tetragonal crystal zirconia and the cubic crystal zirconia" may be directly calculated based on the Raman spectrum intensity ratio, in the present embodiment, there is a simple reference of "%". For example, the Raman spectrum intensity ratio may be calculated by using the unique Raman spectrum (known spectrum data) of each material to analyze the Raman spectrum of the solid electrolyte layer 30 obtained by Raman spectroscopy. In that context, it is preferred to calculate an average value of the ratio originating in each material by analyzing the Raman spectrum obtained at 10 arbitrary positions respectively for the first region 31 and the second region 32.

The Raman spectrum may be obtained by use of a micro-laser Raman spectroscopic device manufactured by Horiba Ltd (model: LabRAM ARAMIS). The method of analyzing the acquired Raman spectrum based on known spectrum data includes use of a CLS method that is a known method for inferring a chemical type based on a plurality of Raman spectra.

The feature of "the ratio of the tetragonal crystal zirconia to the total amount of the tetragonal crystal zirconia and the cubic crystal zirconia" may be controlled by adjusting the used amount of the ceria-based material powder in the preparation step.

The feature of "the ratio of the ceria-based material to the total amount of the ceria-based material and the zirconia-based material" in the present embodiment is a general concept of the content ratio calculated based on component analysis of a cross section. The units used in relation to "the ratio of the ceria-based material to the total amount of the ceria-based material and the zirconia-based material" are "mol %". However a simple denotation as "%" is also present in the present embodiment. Component analysis is possible by use of element analysis that employs an EDX spectrum obtained by energy dispersive x-ray spectroscopy (EDX).

The feature of "the ratio of the ceria-based material to the total amount of the ceria-based material and the zirconia-based material" may be controlled by adjusting the used amount of the ceria-based material powder and zirconia-based material powder in the preparation step.

The thickness of the first region 31 may be configured as 1 micrometer to 10 micrometers. The thickness of the second region 32 may be configured as 3 micrometers to 20 micrometers. The distance L from the interface P with the anode 20 to the first region side surface 32S of the second region 32 may be configured as 1 micrometer to 20 micrometers, and is preferably less than or equal 10 micrometers. The distance L is preferably less than or equal to ½ of the total thickness of the solid electrolyte layer 30, more preferably less than or equal to ⅓, and still more preferably less than or equal to ¼.

Method of Manufacturing Fuel Cell 10

Next, an example of a method of manufacturing a fuel cell 10 will be described.

Firstly, a green body for the anode current collecting layer 21 is formed by molding the anode current collecting layer powder using a die press molding method.

Next, a slurry for the anode active layer is prepared by adding polyvinyl alcohol (PVA) as a binder to a mixture of a pore forming agent (for example, PMMA) and the anode active layer powder. Then, the green body for the anode active layer 22 is formed by printing the slurry for the anode active layer using a printing method or the like onto the green body for the anode current collecting layer 21. In this manner, the green body for the anode 20 is molded.

Next, a slurry for the first region is prepared by mixing terpineol and a binder with a powder of NiO (or an Ni powder) and a zirconia-based material powder containing cubic crystal zirconia. Although at that time, a ceria-based material may be mixed in addition to the zirconia-based material powder, the ratio of the ceria-based material to the total amount of the ceria-based material and the zirconia-based material is controlled to take a value of less than or equal to 0.5%. In this manner, the ratio of the tetragonal crystal zirconia to the total amount of the tetragonal crystal zirconia and the cubic crystal zirconia in the first region 31 may be configured to be greater than or equal to 3.0%. The amount of NiO powder is adjusted so that the atomic weight ratio of nickel to zirconia takes a value of less than or equal to 3.0 at %.

Then, the green body for the first region 31 of the solid electrolyte layer 30 is formed by printing the slurry for the first region using a printing method or the like onto the green body for the anode 20.

Next, a slurry for the second region is prepared by mixing terpineol and a binder with a ceria-based material powder and a zirconia-based material powder containing cubic crystal zirconia. At that time, each material is weighed so that the ratio of the ceria-based material to the total amount of the ceria-based material and the zirconia-based material takes a value of greater than or equal to 1.0%. In this manner, the ratio of the tetragonal crystal zirconia to the total amount of the tetragonal crystal zirconia and the cubic crystal zirconia in the second region 32 may be configured to be greater than or equal to 0.1%.

Then, the green body for the second region 32 of the solid electrolyte layer 30 is formed by printing the slurry for the second region using a printing method or the like onto the green body for the first region 31. In this manner, a green body for the solid electrolyte layer 30 is formed.

Next, a slurry is prepared by mixing terpineol and a binder with a powder for the barrier layer. Then, the green body for the barrier layer 40 is formed by coating the slurry using a screen printing method or the like onto the green body for the solid electrolyte layer 30.

The laminated body of green bodies prepared as described above is cofired (1300 to 1600 degrees C., 2 to 20 hours) to form a cofired body configured by the anode 20, the solid electrolyte layer 30 and the barrier layer 40.

Next, a slurry is prepared by mixing terpineol and a binder with a powder for the cathode. Then, the green body for the cathode active layer 52 is formed by coating the slurry using a screen printing method or the like onto the barrier layer 40. Then the green body for the cathode 50 is fired (1000 to 1100 degrees C., 1 to 10 hours).

Other Embodiments

The present invention is not limited to the above embodiment, and various changes or modifications may be added within a scope that does not depart from the scope of the invention.

(A) In the above embodiment, although the fuel cell 10 includes a barrier layer 40, the barrier layer 40 may be omitted from the fuel cell 10. In this configuration, the second region 32 of the solid electrolyte layer 30 may be connected with the cathode 50.

Figure 2:
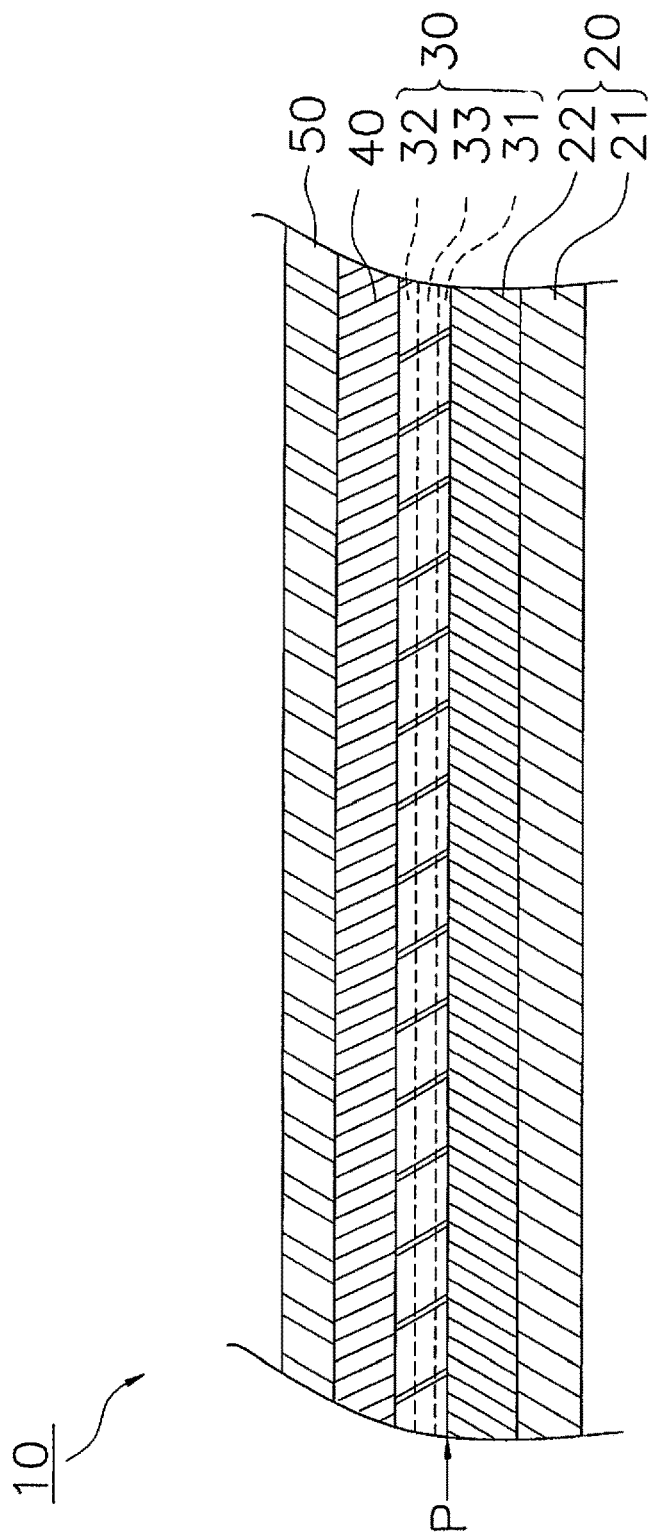
FIG. 2 is an enlarged cross sectional view of the configuration of a fuel cell.

(B) In the above embodiment, although the solid electrolyte layer 30 is configured to include the first region 31 and the second region 32, there is no limitation in this regard. The second region 32 may be disposed between the first region 31 and the cathode 50, or as illustrated in FIG. 2, the solid electrode layer 30 may include a third region 33 disposed between the first region 31 and the second region 32.

The third region 33 contains a zirconia-based material. The third region 33 contains cubic crystal zirconia and tetragonal crystal zirconia. The ratio of the tetragonal crystal zirconia to the total amount of the tetragonal crystal zirconia and the cubic crystal zirconia in the third region 33 is greater than 0.1% and less than 3.0%. Furthermore, the third region 33 may contain a ceria-based material. The ceria-based material includes use of GDC, SDC, or the like, but there is no limitation in this regard. The ratio of the ceria-based material to the total amount of the ceria-based material and the zirconia-based material in the third region 33 is greater than 0.5% and less than 1.0%. The third region 33 may be configured to substantially not contain a ceria-based material.

Figure 3:
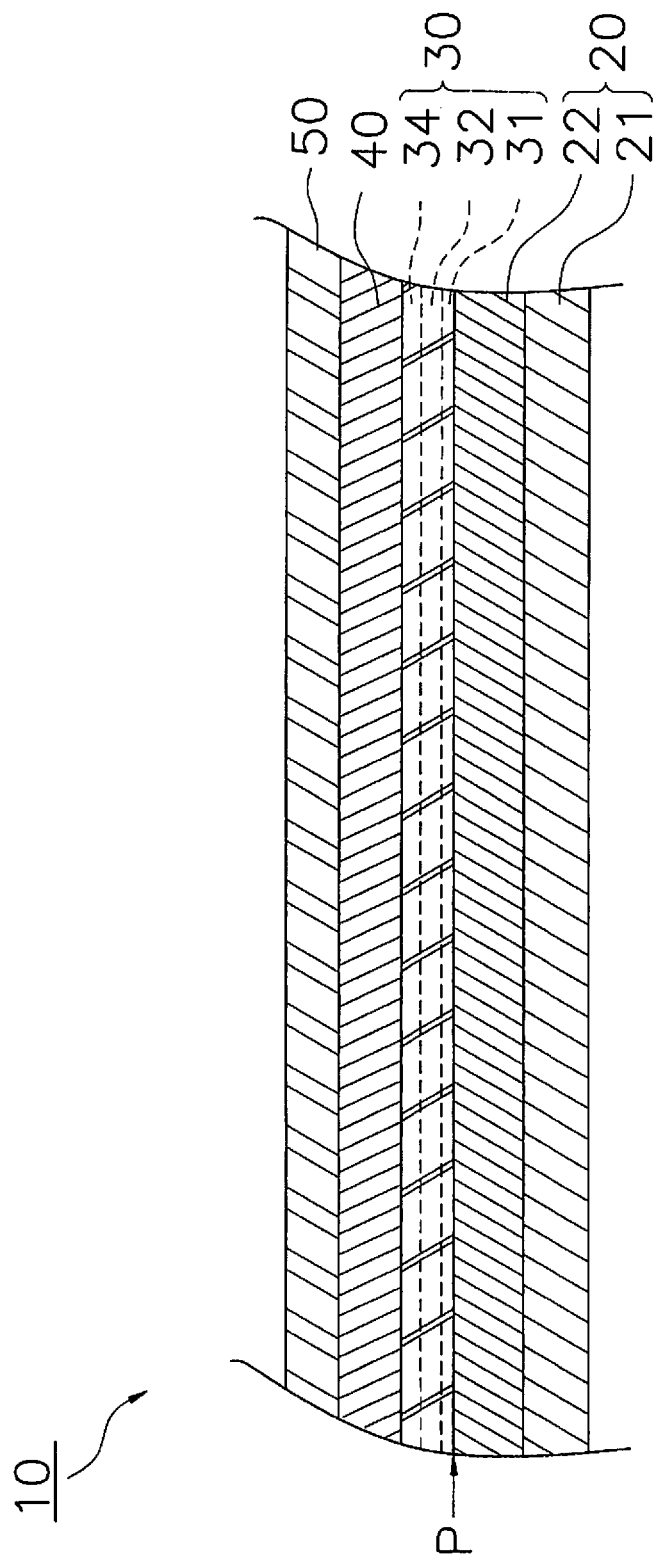
FIG. 3 is an enlarged cross sectional view of the configuration of a fuel cell.

(C) In the present embodiment, although the solid electrolyte layer 30 includes the first region 31 and the second region 32, there is no limitation in this regard. The second region 32 may be disposed between the first region 31 and the cathode 50, or as illustrated in FIG. 3, the solid electrode layer 30 may include a fourth region 34 disposed on the second region 32.

Examples

Preparation of Samples No. 1 to No. 15

Samples No. 1 to No. 15 are prepared as described below.

Firstly, a mixed powder is prepared by drying a slurry of a mixture of IPA and a compounding powder of a pore-forming agent (PMMA), 8YSZ powder and NiO powder in a nitrogen atmosphere.

Next, uniaxial pressing (compaction pressure 50 MPa) is applied to the mixed powder to form a plate of 30 mm length×30 mm width and a thickness of 3 mm. A green body for the anode current collecting layer is prepared by further consolidation of the plate by use of a CIP (compaction pressure: 100 MPa).

Next, the slurry formed from a mixture of IPA and a compounding powder of PMMA and an oxygen ion conducting material (zirconia-based material or ceria-based material) as shown in Table 1 and NiO powder is printed onto the green body for the anode current collecting layer.

Next, a slurry for the first region is prepared by mixing terpineol and a binder with NiO powder and a zirconia-based material powder (8YSZ or 10YSZ) as shown in Table 1. At that time, the used amount of the ceria-based material powder (GDC or SDC) as shown in Table 1 in the slurry for the first region is adjusted to thereby adjust the ratio of the ceria-based material in the first region. However, there is no addition of a ceria-based material to the slurry for the first region in Sample No. 5 to No. 10 and No. 14 and No. 15. Next, a green body for the first region of the solid electrolyte layer is formed by printing the slurry for the first region onto the green body for the anode. Furthermore, the mixed amount of NiO powder is adjusted so that the atomic weight ratio of Ni to Zr is less than or equal to 3.0 at %.

Next, a slurry for the second region is prepared by mixing terpineol and a binder with a ceria-based material powder and a zirconia-based material powder as shown in Table 1. At that time, the used amount of the ceria-based material as shown in Table 1 in the slurry for the second region is adjusted to thereby adjust the ratio of the ceria-based material in the second region. Next, a green body for the second region of the solid electrolyte layer is formed by printing of the slurry for the second region onto the green body for the first region.

Next a GDC slurry is prepared, and a green body for the barrier layer is prepared by coating the GDC slurry onto the green body for the solid electrolyte layer.

Next, the green body for the anode, the electrolyte layer and the barrier layer is fired for 2 hours at 1400 degrees C.

Next, an LSCF slurry is prepared and a green body for the cathode is prepared by coating the LSCF slurry onto the cofired body. The green body for the cathode is fired for 1 hour at 1100 degrees C.

Measurement of Raman Spectrum Intensity Ratio of Cubic Crystal Zirconia and Tetragonal Crystal Zirconia by Raman Spectroscopy Crystal phase analysis is executed by use of Raman spectroscopy in relation to a cross section of the solid electrolyte layer of Samples No. 1 to No. 15. More specifically, reference is made to the respective unique Raman spectra of the cubic crystal zirconia and tetragonal crystal zirconia to thereby analyze the Raman spectra obtained in relation to the cross section of the solid electrolyte layer. The solid electrolyte layer is divided into a first region and a second region with reference to an interface line determined by continuous performance of Raman spectroscopy analysis in a thickness direction as a line at which the ratio of the tetragonal crystal zirconia to the total amount of the cubic crystal zirconia and tetragonal crystal zirconia takes a value of 0.1%. The respective thicknesses of the first region and the second region are shown in Table 1.

Next, an average value of the ratio of the tetragonal crystal zirconia is obtained based on the intensity ratio of the Raman spectra respectively originating respectively in the cubic crystal zirconia and tetragonal crystal zirconia by analyzing Raman spectrum data at plural positions (n=10) in the planar direction and thickness direction in the first region. The average values of the ratio of the tetragonal crystal zirconia in the first region are shown in Table 1.

Next, an average value of the ratio of the tetragonal crystal zirconia is obtained based on the intensity ratio of the Raman spectra originating respectively in the cubic crystal zirconia and tetragonal crystal zirconia by analyzing Raman spectrum data at plural positions (n=10) in the planar direction and thickness direction in the second region. The average values of the ratio of the tetragonal crystal zirconia in the second region are shown in Table 1.

Measurement of Content Ratio of Ceria-Based Material and Zirconia-Based Material by EDX EDX is used to acquire an EDX spectrum at plural positions (n=10) of a cross section of the solid electrolyte layer in Samples No. 1 to No. 15. An average value of the ratio (mol %) of the ceria-based material respectively in the first region and the second region of the solid electrolyte layer is acquired by element analysis based on the EDX spectrum. The average values of the ratio (mol %) of the ceria-based material respectively in the first region and the second region are shown in Table 1.

Crack Observation after Reduction Treatment

Next, each sample is subjected to reduction treatment. More specifically, after increasing the temperature from ambient temperature to 750 degrees C. at 400 degrees C./hr in a state in which the anode side of each sample is exposed to a 4% hydrogen atmosphere, a switch is made from the 4% hydrogen atmosphere to a 100% hydrogen atmosphere. Next, the temperature is maintained for 100 hours at 750 degrees c in a state in which hydrogen gas is supplied to the anode, and then the temperature is decreased over 12 hours to ambient temperature in a state in which the reducing atmosphere is maintained by supplying Ar gas and hydrogen gas (4% relative to Ar).

Then, the presence or absence of cracking is confirmed by microscopic observation of the interface proximate to the first region in the solid electrolyte layer and the anode. The observation results are shown in Table 1.

Measurement of Electrical Conductivity of Solid Electrolyte Layer

After performance of the reduction treatment on each sample, the IR resistance of each sample is measured using an alternating current impedance method. The measurement results are shown in Table 1.

TABLE 1

| Sample No. | Anode Ceramic Material | Zirconia-based Material | Ceria-based Material | Solid Electrolyte Layer First Region Ratio of Ceria-based Material to Total Amount of Zirconia-based Material and Ceria-based Material (mol %) | Ratio of Tetragonal Crystals to Total Amount of Cubic Crystals and Tetragonal Crystals (Raman Spectrum Intensity Ratio) | Thickness (um) |
|---|---|---|---|---|---|---|
| 1 | Nickel-Zirconia | 8YSZ | GDC | 2.0 | 0.6 | 5 |
| 2 | Nickel-Zirconia | 8YSZ | GDC | 0.50 | 3.0 | 3 |
| 3 | Nickel-Zirconia | 8YSZ | GDC | 0.35 | 3.8 | 6 |
| 4 | Nickel-Zirconia | 8YSZ | SDC | 0.22 | 4.8 | 5 |
| 5 | Nickel-Zirconia | 8YSZ | GDC | less than or equal to 0.1 | 6.3 | 10 |
| 6 | Nickel-Zirconia | 8YSZ | SDC | less than or equal to 0.1 | 8.6 | 7 |
| 7 | Nickel-Zirconia | 8YSZ | GDC | less than or equal to 0.1 | 9.2 | 5 |
| 8 | Nickel-Zirconia | 8YSZ | GDC | less than or equal to 0.1 | 12.5 | 10 |
| 9 | Nickel-Zirconia | 10YSZ | GDC | less than or equal to 0.1 | 3.2 | 10 |
| 10 | Nickel-Zirconia | 10YSZ | SDC | less than or equal to 0.1 | 3.3 | 10 |
| 11 | Nickel-Ceria | 8YSZ | GDC | 1.8 | 1.2 | 5 |
| 12 | Nickel-Ceria | 8YSZ | GDC | 0.45 | 3.5 | 3 |
| 13 | Nickel-Ceria | 8YSZ | SDC | 0.16 | 5.5 | 5 |
| 14 | Nickel-Ceria | 10YSZ | GDC | less than or equal to 0.1 | 3.4 | 10 |
| 15 | Nickel-Ceria | 10YSZ | SDC | less than or equal to 0.1 | 3.5 | 10 |

| Sample No. | Solid Electrolyte Layer Second Region Ratio of Ceria-based Material to Total Amount of Zirconia-based Material and Ceria-based Material (mol %) | Ratio of Tetragonal Crystals to Total Amount of Cubic Crystals and Tetragonal Crystals (Raman Spectrum Intensity Ratio) | Thickness (um) | Presence/ Absence of Cracking | Electrical Conductivity | Evaluation |
|---|---|---|---|---|---|---|
| 1 | 0.5 | 0.3 | 10 | Yes | Low | x |
| 2 | 1.0 | less than or equal to 0.1 | 20 | No | High | o |
| 3 | 2.5 | less than or equal to 0.1 | 15 | No | High | o |
| 4 | 3.5 | less than or equal to 0.1 | 10 | No | High | o |
| 5 | 4.6 | less than or equal to 0.1 | 10 | No | High | o |
| 6 | 3.2 | less than or equal to 0.1 | 10 | No | High | o |
| 7 | 4.4 | less than or equal to 0.1 | 15 | No | High | o |
| 8 | 3.0 | less than or equal to 0.1 | 10 | No | High | o |
| 9 | 5.2 | less than or equal to 0.1 | 15 | No | High | o |
| 10 | 4.6 | less then or equal to 0.1 | 15 | No | High | o |
| 11 | 0.6 | 0.4 | 10 | Yes | Low | x |
| 12 | 1.5 | less than or equal to 0.1 | 20 | No | High | o |
| 13 | 4.1 | less than or equal to 0.1 | 10 | No | High | o |
| 14 | 5.5 | less than or equal to 0.1 | 15 | No | High | o |
| 15 | 5.8 | less than or equal to 0.1 | 15 | No | High | o |

As shown in Table 1, cracking is observed in Samples No. 1 and No. 11 in the interface proximate to the first region in the solid electrolyte layer and the anode after the reduction treatment. This result is due to the fact that the ceria ratio in the first region in the solid electrolyte layer respectively in Samples No. 1 and No. 11 is high and therefore the expansion amount in the first region during reduction treatment was large in comparison to the anode. Furthermore, since it is known that the strength of tetragonal crystal zirconia is greater than the strength of cubic crystal zirconia, another cause is the absence of sufficient connectivity in the interface of the anode and the first region due to the low tetragonal crystal zirconia ratio in the first region.

Therefore it is shown that a ratio of the ceria-based material to the total amount of the ceria-based material and the zirconia-based material in the first region 31 is preferably less than or equal to 0.5%, and that the ratio of the tetragonal crystal zirconia to the total amount of the tetragonal crystal zirconia and the cubic crystal zirconia in the first region is preferably greater than or equal to 3.0%.

As shown in Table 1, Samples No. 1 and No. 11 exhibit a reduction in the cell electrical conductivity. This result is due to the excessively high ratio of tetragonal crystal zirconia in the second region of the solid electrolyte layer respectively in Samples No. 1 and No. 11.

Therefore it can be seen that the ratio of the ceria-based material to the total amount of the ceria-based material and the zirconia-based material in the second region 32 is preferably greater than or equal to 1.0%, and the ratio of the tetragonal crystal zirconia to the total amount of the tetragonal crystal zirconia and the cubic crystal zirconia is preferably less than or equal to 0.1%.

As shown in Table 1, Samples No. 1 to No. 10, and Samples No. 12 to No. 15 have been confirmed to exhibit the above results irrespective of the type of oxygen ion conductive material that is contained in the anode.

The invention claimed is:
1. A fuel cell comprising;
   an anode containing an oxygen ion conducting material and nickel,
   a cathode, and
   a solid electrolyte layer disposed between the anode and the cathode, wherein:

the solid electrolyte layer contains a zirconia-based material as a main component, and contains a ceria-based material and nickel as secondary components, the zirconia-based material comprises a tetragonal crystal zirconia and a cubic crystal zirconia, the solid electrolyte layer includes a first region disposed on the anode and a second region disposed between the first region and the cathode, a ratio of the ceria-based material to a total amount of the ceria-based material and the zirconia-based material in the first region is less than or equal to 0.5 %, a ratio of the tetragonal crystal zirconia to a total amount of the tetragonal crystal zirconia and the cubic crystal zirconia in the first region is greater than or equal to 3.0 %, an atomic weight ratio of nickel to zirconium in the first region is less than or equal to 3.0 at %, a ratio of the ceria-based material to a total amount of the ceria-based material and the zirconia-based material in the second region is greater than or equal to 1.0 %, and a ratio of the tetragonal crystal zirconia to a total amount of the tetragonal crystal zirconia and the cubic crystal zirconia in the second region is less than or equal to 0.1 %.

\* \* \* \* \*